United States Patent
McGuire

[11] 3,918,142
[45] Nov. 11, 1975

[54] METHOD OF FABRICATING A VENT STRUCTURE

[75] Inventor: Joseph C. McGuire, Kennewick, Wash.

[73] Assignee: McDonnell Douglas Corporation, Long Beach, Calif.

[22] Filed: Mar. 29, 1974

[21] Appl. No.: 456,183

Related U.S. Application Data

[62] Division of Ser. No. 394,054, Sept. 4, 1973, Pat. No. 3,838,557.

[52] U.S. Cl. ......... 29/420; 29/DIG. 31; 29/DIG. 46
[51] Int. Cl. .............................................. B22f 3/24
[58] Field of Search ........ 29/163.5 F, 420, DIG. 31, 29/470.9, 525, DIG. 46; 55/385, 482, 525, DIG. 9; 138/42, 146; 176/68, 86 A; 220/371, 372, 373, 374

[56] References Cited
UNITED STATES PATENTS

| | | | |
|---|---|---|---|
| 2,815,889 | 12/1957 | Stetz et al. | 138/42 UX |
| 2,985,411 | 5/1961 | Madden | 29/DIG. 46 |
| 3,274,066 | 9/1966 | Zumwatt | 176/68 |
| 3,315,336 | 4/1976 | Parker et al. | 29/163.5 F |
| 3,406,094 | 10/1968 | Beisswenger et al. | 176/68 X |
| 3,459,636 | 8/1969 | Germer | 176/68 |
| 3,573,168 | 3/1971 | Campbell | 176/68 |
| 3,677,300 | 7/1972 | King | 138/42 |
| 3,697,377 | 10/1972 | Gauthron | 176/68 |
| 3,708,858 | 1/1973 | Sasaki | 29/163.5 F |
| 3,801,447 | 4/1974 | Heenan | 176/86 R |

*Primary Examiner*—C. W. Lanham
*Assistant Examiner*—D. C. Reiley, III
*Attorney, Agent, or Firm*—D. N. Jeu; Walter J. Jason; Donald L. Royer

[57] ABSTRACT

A vent structure for reliable long term operation at high temperatures is fabricated by annealing a tubing of predetermined length and size, uniformly filling a normally upper portion of the tubing with a predetermined thickness layer of fine alumina particles, flattening and doubly folding and pressing the upper portion of the tubing at predetermined pressures, annealing the formed tubing, and installing a particulate filter in the undeformed normally lower portion of the tubing. For use in venting helium generating reactor control pins located under hot molten sodium, a vent assembly including the vent structure and providing an air lock between the outer molten sodium and the vent is affixed to the upper end of each control pin.

7 Claims, 12 Drawing Figures

METHOD OF FABRICATING A VENT STRUCTURE

This is a division, of application Ser. No. 394,054 filed Sept. 4, 1973, now U.S. Pat. No. 3,838,557.

BACKGROUND OF THE INVENTION

My present invention pertains generally to venting devices. More particularly, the invention relates to a very effective and practical vent structure for use in the control pins of a liquid metal fast breeder reactor (LMFBR), for example, and to a novel method of fabricating the vent structure.

As is well known, helium (He) is generated in the LMFBR control pins as the result of a neutron, alpha $(n,\alpha)$ reaction on boron (B). This helium is generated in each pin up to the rate of 3 cc/hr or 72 cc/day volume at standard temperature and pressure (STP). If all of this generated gas is released from the boron carbide ($B_6C$) matrix of a control pin, the resulting 26 liters per year poses a serious containment and pressure problem using closed control pins, especially since sudden onsets of extreme pressure could develop during the reactor power cycles. Conversely, the use of open control pins allows the boron carbide to come into direct contact with the high temperature sodium (Na) liquid metal coolant with the resulting attack thereon and likelihood of boron contamination of the coolant.

A suitable vent structure for use with a reactor control pin and a vent structure fabrication method are shown, described and claimed by the inventor in his copending U.S. Pat. application Ser. No. 296,680 filed on Oct. 11, 1972 for Vent Structure and Method of Fabrication. While such disclosed vent structure and fabrication method are entirely satisfactory, a vent structure providing more precise flow characteristics therethrough, and which structure can be more consistently and easily fabricated to produce an accurate predetermined flow, is desirable and useful in certain applications.

SUMMARY OF THE INVENTION

Briefly, and in general terms, my invention is preferably accomplished by providing a vent structure, including a ductile and relatively thin wall tubing having an undeformed normally lower portion and a flattened and doubly folded and pressed normally upper portion, in a molten sodium coolant reactor gas generating control pin, for example, to release its generated gas normally at a relatively low flow rate such that the control pin (gas container) is maintained in a slightly pressurized state to prevent backflow of molten sodium or vapor and consequential contamination thereof. The formed (flattened and folded and pressed) upper portion of the vent structure preferably includes a thin film or layer of fine alumina particles between the flattened opposing faces inside the tubing, to prevent the vent from sintering together due to grain growth across the faces occurring at high temperatures and long term operation. The vent structure preferably further includes a particulate filter in the undeformed lower portion of the vent tubing.

The method of fabricating the vent structure includes the steps, among others, of applying a slight chamfer to the inside edge of the end of a normally upper portion of a metal tubing of predetermined length and size, annealing the tubing at a predetermined temperature for a predetermined period, uniformly filling the upper portion of the tubing with a predetermined thickness layer of fine alumina particles, flattening an upper portion of the tubing and then doubly folding and pressing such upper portion at predetermined pressures, and again annealing the tubing at a predetermined temperature for a predetermined period. Finally, a porous metal particulate filter can be press-fitted into the undeformed lower portion of the tubing. The resultant vent structure is structurally stable and can operate reliably in a high temperature environment over a long term, and gas flow thereof is substantially a linear function of the applied gas pressure differential up to the point where the elastic limit of the metal tubing is reached.

To fill the upper portion of the tubing with the uniform alumina layer prior to flattening, the tubing is placed with chamfered end down concentrically about a polished control rod of predetermined diameter and length mounted upright on a flat resilient base. An appropriate amount of alumina particles is added at the top of the tubing which can be suitably held stationary against the surface of the resilient base, and the alumina particles are packed down around the control rod using a vibrator held against the side of the tubing. The base and rod are next turned to horizontal and the central control rod is withdrawn to leave a uniformly packed layer of alumina in the tubing. The normally upper portion of the tubing is then flattened, folded and pressed as described above.

For use in venting helium generating reactor control pins located under a corrosive and reactive liquid environment such as molten sodium, a vent assembly including the vent structure and providing an air lock between the outer molten sodium and vent structure is attached to each pin to ensure that liquid sodium does not directly contact the vent. The vent assembly includes an adapter plug mounting the lower end of the vent structure, cover structure attached to the plug and forming an air lock chamber housing the part of the vent structure above the plug, and a baffle made of porous metal provided in the chamber space between the upper portion of the vent structure and a number of small bleed holes in the cover structure. The adapter plug is shaped to be suitably attached to the upper end of a control pin, and the baffle allows free passage of gas while preventing the passage of particulate matter and impeding the passage of molten sodium. The possibility of sodium backflow is virtually eliminated by use of the air lock and the anti-splash porous metal baffle.

BRIEF DESCRIPTION OF THE DRAWINGS

My invention will be more fully understood, and other advantages and features thereof will become apparent, from the following description of an exemplary embodiment and method of the invention. The description is to be taken in conjunction with the accompanying drawings, in which:

FIGS. 3A, 3B, 3C, 3D, 3E, 3F, 3G, 3H, 3I and 3J illustrate certain main steps in a method of fabricating the vent structure.

DESCRIPTION OF THE PRESENT EMBODIMENT AND METHOD

In the following description and accompanying drawings of an illustrative embodiment and method of my invention, some specific dimensions and types of materials are disclosed. It is to be understood, of course, that such dimensions and types of materials are given as examples only and are not intended to limit the scope of this invention in any manner.

Figure 1:
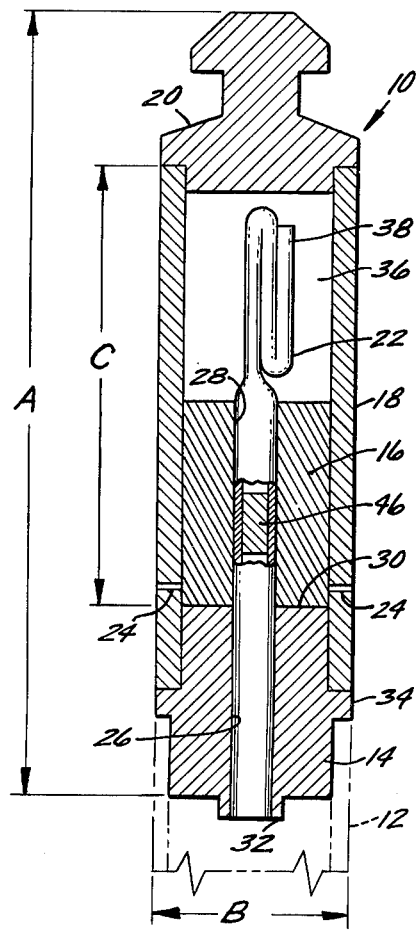
FIG. 1 is an elevational view, shown in section, of a vent assembly which is to be affixed to the normally upper end of a reactor control pin.

FIG. 1 is an elevational view, shown in section, of the upper vent assembly 10 of a control pin 12 which is used, for example, in a liquid metal (sodium) cooled fast breeder nuclear reactor (not shown). The control pin 12 and its upper vent assembly 10 are normally fully immersed deeply in (under approximately 8 feet of) the molten sodium reactor coolant operating at temperatures of about 900° to 1100°F. Each control pin 12 contains a series of boron carbide pellets (not shown) and is a source of generated helium. The vent assembly 10 is, of course, hermetically attached to the upper end of the control pin 12 and generally includes a vent adapter plug 14, baffle 16, air lock tube 18, air lock cap 20, and vent structure 22.

The vent plug 14, air lock tube 18, and air lock cap 20 are preferably made of a material similar to that of the control pin 12 structural material such as Type 316 stainless steel, which is compatible with a hot sodium (liquid and vapor) environment. Baffle 16 is made of a porous metal which is resistant to attack by hot sodium. A felt or foam metal can be used and, in the exemplary vent assembly 10, a Type F-315 nickel felt metal produced by Huyck Metals Corporation was used. This material is about 20% dense and allows free passage of gas while preventing the passage of particulate matter and impeding any passage of molten sodium.

The air lock tube 18 has, for example, four vent or bleed holes 24 which can be 0.0135 inch in diameter equiangularly spaced 90° about the air lock tube at a predetermined distance above the lower end thereof. The vent plug 14 has an axially drilled central hole 26 and the baffle 16 also has an axially punched central hole 28. The punched baffle 16 is packed on the vent structure 22 against the upper surface 30 of vent plug 14 which is joined at its lower end 32 to the lower end of the vent structure by a standing lip electron-beam weld for maximum cleanliness and minimal disturbance of the surrounding metal.

When the lower end of the air lock tube 18 is welded to flange 34 of the vent plug 14, the vent holes 24 are located slightly above the upper surface 30 of the vent plug and directly adjacent to the lower side surface of the baffle 16. Welding of the air lock cap 20 to the upper end of the air lock tube 18 forms an air lock chamber 36 containing cover gas which provides an "air lock" effect over the vent structure 22 such that liquid sodium does not directly or normally contact the upper vent end 38. The possibility of sodium backflow is virtually eliminated by use of the air lock chamber 36 and the antisplash porous metal baffle 16 in the vent assembly 10 of control pin 12.

The air lock chamber 36 is a plenum chamber which is made large enough to provide a sufficient reservoir of gas that prevents liquid sodium which might enter the lower bleed holes 24 and into the baffle 16, as in the event of any sudden fluctuation (loss) in gas pressure due to a temporary reactor temperature change (drop), from ever reaching the vent opening in the upper vent end 38 of the vent structure 22. Of course, the sodium is subsequently forced out of the chamber 36 following the temperature change as the gas pressure therein builds up to equalize with the environmental (8 feet of liquid sodium) pressure.

The bleed holes 24 are made adequately small so that they will not admit the surge of liquid sodium into the air lock chamber 36, which surge can occur when the control pin 12 is first immersed in the sodium. On the other hand, the bleed holes 24 are made adequately large mainly for convenience of drilling very small holes in stainless steel with the presently available drills and methods. In any event, the combined size of the bleed holes 24 must be about equal or (and are vastly) larger than the effective size of the vent discharge opening in the upper vent end 38 of the vent structure 22, and allows gas to escape from the chamber 36 at about the rate that it is being released from the vent structure.

The vent assembly 10 has general overall dimensions of length A, diameter B, and an approximate gas space length C (connected through vent holes 24 to the exterior). Illustrative values for these dimensions are A of 1.80 inches, B of 0.435 inch (maximum), and C of 0.95 inch, for example. This vent assembly 10 is, of course, to be welded to the upper end of the stainless steel tube (control pin 12) having a 0.395 inch inside diameter which accommodates the lower portion of vent plug 14. Other dimensions of the vent assembly 10 can be proportionately estimated adequately from the elevational view of FIG. 1 and, while approximate, will suffice for most purposes. The vent has a gas flow rate sufficient to maintain pressure in the air lock chamber 36 and in control pin 12 to prevent backflow of sodium and any possibly contaminating outside cover gas, respectively.

Figure 2:
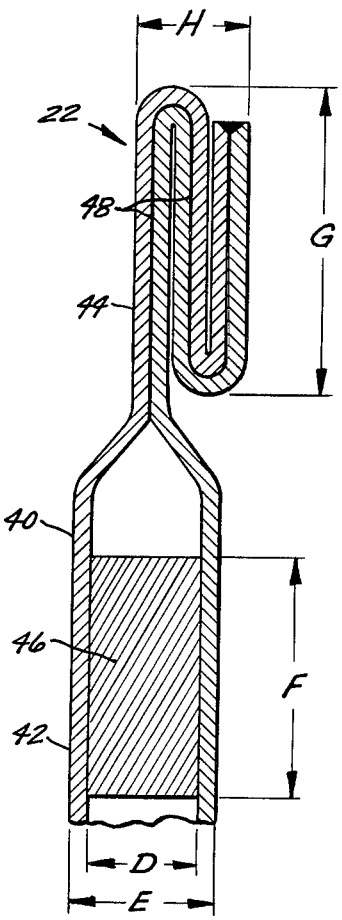
FIG. 2 is a fragmentary elevational view, shown in section and enlarged, of a vent structure constructed according to this invention.

FIG. 2 is a fragmentary elevational view, shown somewhat enlarged in section, of the vent structure 22. The vent structure 22 includes a thin wall tubing 40 having an undeformed lower portion 42, and a flattened and folded and pressed upper portion 44. The flattened upper portion 44 is preferably folded at least twice, as shown. A particulate filter 46 is provided in the lower portion 42 of the tubing 40, and a film or layer 48 of fine particles or powder is provided between the pressed opposing surfaces inside the upper portion 44. The tubing 40 can be made of any material sufficiently ductile to survive the flattening, folding and pressing operations without cracking, and there are appropriate materials readily available for operation or use under a very wide range of environmental and temperature conditions.

In the interests of compatibility and uniformity, the tubing 40 can be made of the same material as the control pin 12 structural material. Thus, the tubing 40 can be made of Type 316 stainless steel having an inside diameter D and an outside diameter E as indicated in FIG. 2. Likewise, the particulate filter 46 can be made of Type F-315 nickel felt metal similar to that of baffle 16 (FIG. 1) and having a length F. The cylindrically shaped filter 46 can be installed in the lower portion 42 by press-fitting it into the tubing 40 to a position approximately as illustrated. Exemplary dimensions for the inside diameter D, outside diameter E, and length F are respectively 0.093, 0.125, and 0.250 inch, for example.

The formed upper portion 44 of the exemplary vent structure 22 has a length G and a thickness H as indicated in FIG. 2. The film or layer 48 can consist essentially of, for example, compacted 0.3 micron diameter aluminum oxide ($Al_2O_3$) particles. This particle size could be increased to as large as 1 micron or reduced to as small as 0.05 micron for entirely satisfactory operation. A particle size larger than 1 micron might provide individual support points during forming (flattening and pressing) of the upper portion 44 and which may prevent the attainment of very low gas flow rates. Particles sizes larger than 1 micron are nevertheless desirably and effectively used satisfactorily in the vent structure 22. Of course, a particle size smaller than 0.05 micron may not prevent eventual grain growth across the proximate faces of a flattened tube at high temperatures. Thus, in regular long term and high temperature operation, it is possible for the formed upper portion 44 of the vent structure to sinter together.

Illustrative dimensions for the length G and thickness H are respectively about 0.350 and 0.092 inch, for example. The thickness of the film or layer 48 can be approximately 0.005 inch, when pressed, although the layer thickness in the exemplary vent structure 22 can be generally between 0.003 and 0.007 inch for satisfactory operation. Exact pressing parameters and anneal conditions are functions of the particular size and wall thickness of the tubing 40 used and the desired gas flow rate. It may be noted that the formed vent structure 22, with or without the layer 48 of alumina particles, can be used independently as a gas flow metering device in various applications following suitable flow calibration thereof.

A substantially linear relationship exists in the response in helium flow rate of the vent structure 22 to change in helium pressure, and helium flow rate drops linearly as the driving pressure decreases. Flow rate is, of course, lower at the higher temperatures since there are less gas molecules in a fixed volume at such temperatures with the maintained pressure differential. With the helium generation rate per control pin 12 (FIG. 1) at approximately 3 cc/hr, for example, the vent structure 22 provides an average helium diffusion rate of about 1 cc/hr at one atmosphere pressure differential after about 60 thermal cycles. This allows a helium pressure of approximately 4 atmospheres inside the control pin 12 to provide a two-fold advantage. First, pressurized helium has a higher thermal conductivity to dissipate radiation heating in the control pin and, second, the pressure minimizes any possibility of back diffusion of either sodium vapor or cover gas into the control pin. The positive helium pressure maintained in the control pin 12 by the vent structure 22 can drop by a factor of about 2 without compromising the sodium seal provided.

Figure 3A:
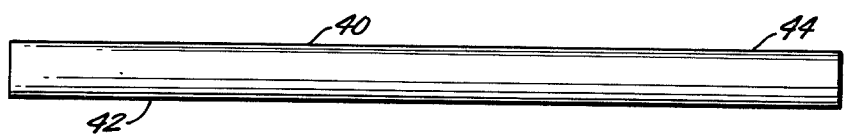
Figure 3B:
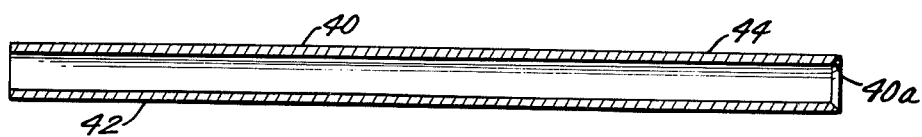
Figure 5C:
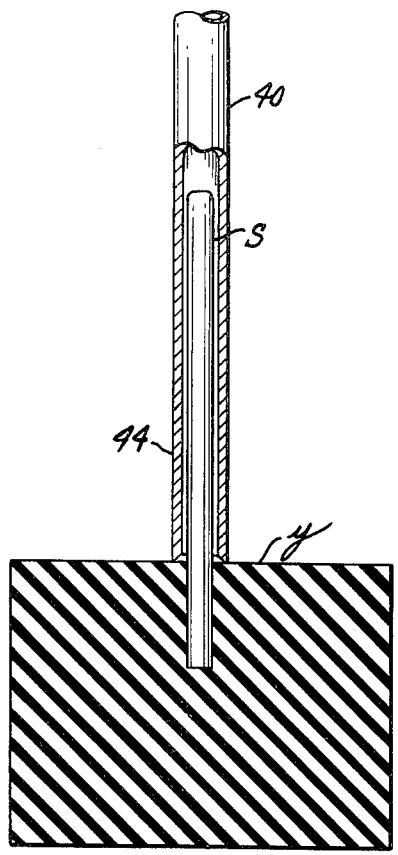
Figure 5D:
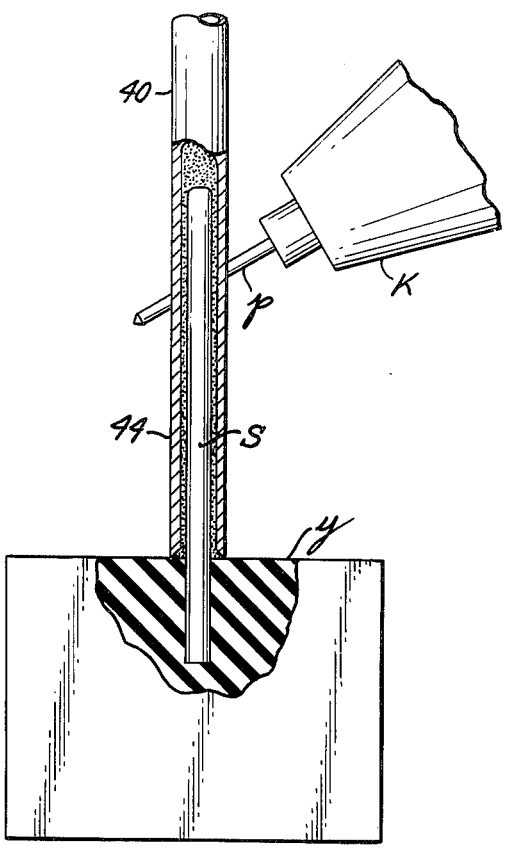
Figure 5E:
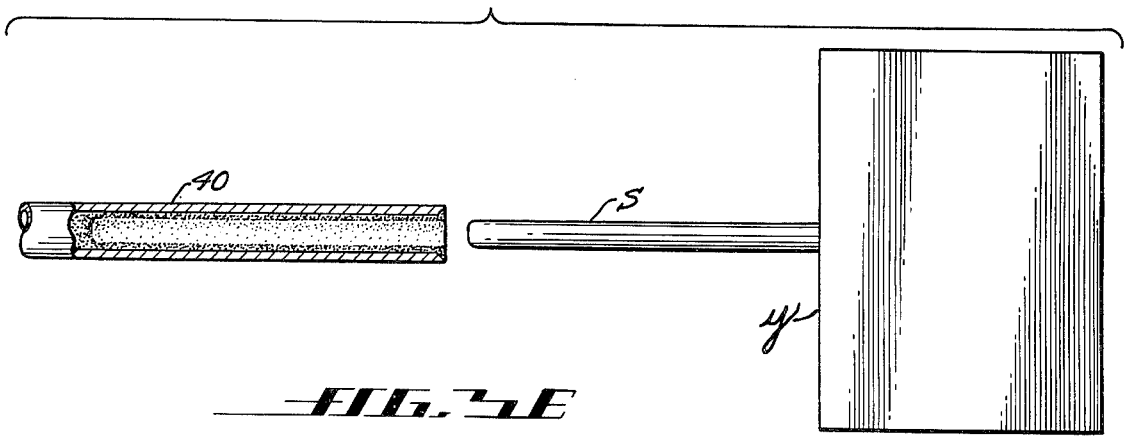
Figure 5F:
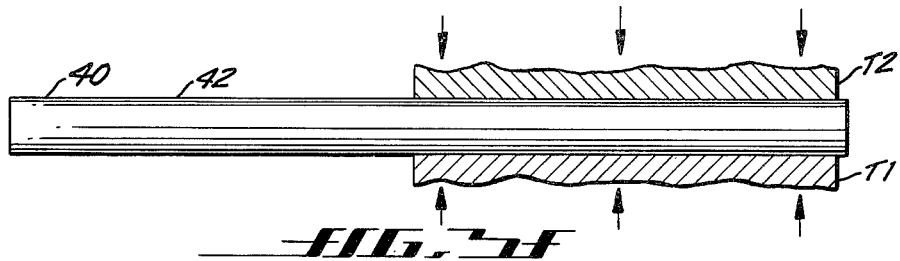
Figure 5G:
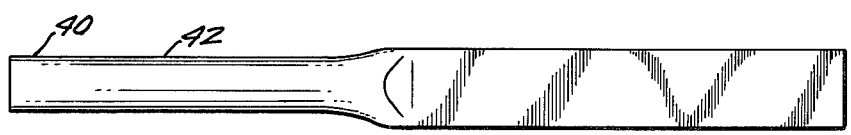
Figure 5H:
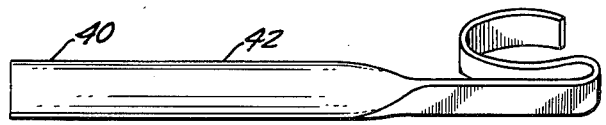
Figure 5I:
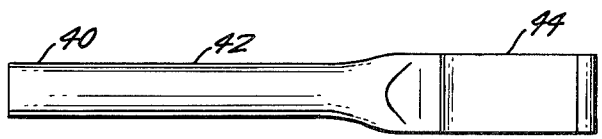
Figure 5J:
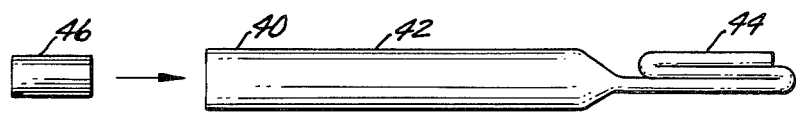

FIGS. 3A through 3J illustrate certain main steps in the method of fabricating the vent structure 22. In FIG. 3A, a Type 316 stainless steel tubing 40 of 0.125 O.D. and 0.016 inch wall thickness is cut to a predetermined length of 10 inches, for example. A slight chamfer 40a as shown in FIG. 3B is applied to the inside edge of the end to be pressed as a precaution because metallographic inspection has shown a tendency for the "mouth" of the vent to be indented during pressing. The tubing 40 is then vacuum annealed 15 minutes at 1900°F, for example, and ultrasonically inspected for any surface or subsurface flaws. Austenitic stainless steel is virtually unaffected by pure hot sodium at temperatures below 1000°F. In the region between 1000° and 1500°F, however, there is evidence of some measurable attack, particularly at the grain boundaries. Based on this constraint, the vent tubing 40 wall thickness was selected to be 0.016 inch to provide a safety factor of at least 3 over the deepest sodium penetration observed at 1500°F.

The annealed tubing 40 is next placed over a control rod or shaft S mounted upright in a resilient block y with the chamfered tubing end down as illustrated in FIG. 3C. The rod S can be a carefully polished brass rod 1.5 inches long and 0.065 inch in diameter, and the resilient block y can be of rubber, for example. The tubing 40 may be manually held concentrically about the rod S against the block y and an appropriate amount of 0.3 micron average diameter alumina ($Al_2O_3$) particles is added at the top of tubing 40 (using a glass funnel) until the top of the rod S is at least covered. The rod S extends, of course, above the upper surface of block y for a distance equal to at least the length of the upper tubing portion 44. The alumina particles are then packed down around the control rod S using, for example, a hand held vibrator K positioned with its output shaft p in contact with the side of the tubing 40 as shown in FIG. 3D. The vibrator K can be, for example, a commonly available electric scriber which has an output shaft that reciprocates axially in and out at 7200 cps. The stroke length on such a scriber can be adjusted (for different diameter tubings 40) by a knob (not shown) at the top of the tool. An even yet thin layer of particulate ceramic can thus be obtained for an effective grain growth barrier. By varying the diameter of the control rod S, any required thickness of ceramic layer can be provided. It should be noted that the control rod S functions such that it is not critical that the tubing 40 need be held very concentrically about the control rod.

The assembly shown in FIG. 3D is turned horizontal and the control rod S is withdrawn to leave a "tube" of alumina within the tubing 40 as depicted in FIG. 3E. This partially coated tubing 40 is then transferred to, for example, a Carver hydraulic press for subsequent flattening and pressing operations. A predetermined length of the internally coated end portion of the tubing 40 is flattened in the Carver press at a predetermined flattening pressure. The ceramic layered end portion of the tubing 40 can be placed on a tool steel block T1 approximately 1 inch wide so that the chamfered end just barely overhangs and a second block T2 is placed on top as shown in FIG. 3F. The blocks T1 and T2 are suitably positioned in the Carver press which is operated at a predetermined pressure of, for example, 2000 psi and released to produce a flattened area as illustrated in FIG. 3G. The flattened portion of tubing 40 can be next formed by manually bending it (with a pair of pliers) into a Z configuration as shown in FIG. 3H, and a final pressing operation is performed thereon in the Carver press at a predetermined pressing pressure of, for example, 2000 psi. This produces the configuration illustrated in FIGS. 3I and 3J and which creates a flat tortuous path for the escaping gas.

The compacted alumina throughout the vent wall interface eliminates the operational sintering tendency due to grain growth across the faces of the flattened tubing 40 at high temperatures. The formed tubing 40 is then preferably vacuum annealed 15 minutes at 1900°F again. A particulate filter 46 is finally press-fitted into the formed tubing 40 as indicated in FIG. 3J to complete the vent structure 22. The formed tubing 40 is preferably annealed particularly where the vent structure 22 is used in high temperature (600°C or 1112°F) operation because flow rate doubles in the vent structure going from a stressed to annealed condition and operating at the high temperature of 600°C, the vent will self-anneal over a period of 3 weeks.

The alumina or aluminum oxide powder is compatible with any vent tubing material and is uniquely suited for operation in the presence of hot sodium vapor. It is an extremely stable oxide and is the only commonly processed oxide resistant to attack by hot sodium and sodium vapor. As mentioned previously, however, exact pressing parameters (and anneal conditions) are a function of the particular size and wall thickness of the vent tubing used and the desired gas flow rate. In the flattening and pressing operations required on the particular vent tubing 40 of 0.125 inch O.D. and 0.016 inch wall, gas flow rate at 15 psi differential pressure is illustratively varied according to flattening and pressing pressures as indicated below.

| Flattening Pressure (psi) | Pressing Pressure (psi) | Flow Rate (cc/hr at 15 psi $\Delta$ P) |
|---|---|---|
| For 8 microns average alumina particle size: | | |
| 1000 | 500 | 30 |
| 1000 | 1000 | 15 |
| 1400 | 1400 | 8 |
| 2000 | 2000 | 4 |
| 4000 | 4000 | 2.5 |
| For 0.3 micron average alumina particle size: | | |
| 1000 | 500 | 6 |
| 1000 | 1000 | 3 |
| 2000 | 2000 | 1 |
| 4000 | 4000 | 0.2 |
| For 0.1 micron average alumina particle size: | | |
| 1000 | 500 | 2.5 |
| 1000 | 1000 | 1.5 |
| 2000 | 2000 | 0.5 |
| 4000 | 4000 | 0.01 |

By changes in pressing pressures and techniques, the vent structure 22 can be fabricated for any required flow down to, for example, 0.0036 cc/hr helium at one atmosphere pressure differential. Also, flow through the vent structure 22 can increase greatly in case of a sudden increase in helium pressure within the control pin 12. Thus, the vent structure 22 effectively acts to relieve pressure transients in the control pin 12 to prevent any possible ruptures thereof and then returns by natural springback to normal operation if the elastic limit of the formed tubing 40 has not been exceeded. The illustrative vent structure 22 has been tested and found good to over 3500 psi, for example. While the doubly folded, formed tubing 40 does not actually unfold in order to relieve high increases in pressure, it tends to do so. This was substantiated in testing a vent structure 22 with increasing pressure until it burst at a very high pressure, when the formed tubing 40 did unfold to some extent.

Because of the production of lithium as a result of the (neutron, alpha) reaction on boron carbide and the possibility of boron carbide disintegration under irradiation, the unpressed section (lower portion 42 in FIG. 2) of tubing 40 can include the particulate filter 46 which allows free passage of gas. To produce the particulate filter 46, nickel felt metal can be used. Of course, a foamed instead of felt metal can be used and the metal can be stainless steel instead of nickel, for example, since such materials are resistant to attack by hot sodium and allow free passage of gas. A filter disc or discs of appropriate size can be punched out from the nickel felt metal to form the filter 46.

Baffle 16 can be fabricated from stainless steel foam metal. This baffle material can, of course, be nickel instead of stainless steel and felt instead of foam metal. Indeed, it is usually convenient and preferable that the baffle 16 and filter 46 be made of the same identical material. The foam metal is punched or otherwise shaped to size and configuration. In similar manner, the vent adapter plug 14, air lock tube 18 and air lock cap 20 can be shaped from a Type 316 stainless steel rod. The plug 14, tube 18 and cap 20 can be machined to size and shape from the stainless steel rod. It is, of course, apparent that the formed tubing 40, filter 46, baffle 16, adapter plug 14, air lock tube 18 and air lock cap 20 can be fabricated in any elected sequence or all concurrently.

The particulate filter 46 is packed into the formed tubing 40 to complete vent structure 22 and the baffle 16 is packed onto the formed tubing. The adapter plug 14 is installed on the vent structure 22 against the lower surface of the baffle 16 and is joined at its lower end 32 to the lower end of the vent structure by a standing lip electron-beam weld. A helium leak check is made of the electron-beam weld, and the air lock cap 20 is tungsten-inert-gas (TIG) or electron-beam welded to the air lock tube 18 with its vent holes 24 (FIG. 1) located at the opposite end thereof away from the cap. The air lock tube 18 is then TIG welded to the adapter plug 14 to complete vent assembly 10. Completed assemblies can be packaged in plastic bags and sealed for delivery.

The vent structure 22 is, for example, produced for operation in a hostile environment including high purity molten sodium at 600°C and a radiation fluence level of $10^{20}$ to $10^{22}$ nvt (neutron density-velocity-time or neutrons/cm$^2$) with an average neutron energy of 70.1 Mev (million electron volts). It is, however, evident that the vent structure 22 can be readily adapted for use to any application where a controlled gas release in either a friendly or hostile environment is necessary. The only requirement is choice of metal tubing and ceramic compatible with the environment and capable of fabrication into the desired shape.

While an exemplary embodiment and method of this invention have been described above and shown in the accompanying drawings, it is to be understood that such embodiment and method are merely illustrative of, and not restrictive on, the broad invention and that I do not desire to be limited in my invention to the specific constructions or arrangements or steps shown and described, for various obvious modifications may occur to persons having ordinary skill in the art.

I claim:

1. A method of fabricating a vent structure, which comprises the steps of:
    placing a normally upper portion of a ductile thin-walled tubing of predetermined length and size over and about an upright rod of predetermined diameter and length mounted on a base;
    adding a predetermined amount of fine separating particles into said tubing;
    vibrating said tubing to pack said particles therein down around said rod;
    withdrawing said rod to leave a layer of said particles in said upper tubing portion; and
    flattening said upper tubing portion at a predetermined flattening pressure.

2. The invention as defined in claim 1 further comprising the step of mounting said rod upright on a resilient base prior to placing said upper tubing portion over and about said rod.

3. The invention as defined in claim 2 further comprising the step of turning said rod and tubing generally horizontal following vibrating said tubing and prior to withdrawing said rod to leave a layer of said particles in said upper tubing portion.

4. The invention as defined in claim 1 further comprising the step of forming a chamfer on an inside edge of the end of said upper tubing portion prior to placing the same over and about said rod.

5. The invention as defined in claim 4 further comprising the step of turning said rod and tubing generally horizontal following vibrating said tubing and prior to withdrawing said rod to leave a layer of said particles in said upper tubing portion.

6. The invention as defined in claim 5 further comprising the step of mounting said rod upright on a resilient base prior to placing said upper tubing portion over and about said rod.

7. The invention as defined in claim 1 further comprising the step of turning said rod and tubing generally horizontal following vibrating said tubing and prior to withdrawing said rod to leave a layer of said particles in said upper tubing portion.

* * * * *